United States Patent

Naritomi

[11] Patent Number: 5,547,621
[45] Date of Patent: Aug. 20, 1996

[54] CAVITY EXPANDING AND CONTRACTING FOAM INJECTION MOLDING METHOD

[75] Inventor: Masanori Naritomi, Urayasu, Japan

[73] Assignee: Taisei Plas Co., Ltd., Tokyo, Japan

[21] Appl. No.: 314,259

[22] Filed: Sep. 30, 1994

[51] Int. Cl.⁶ .......................... B29C 44/02; B29C 44/10
[52] U.S. Cl. .............................. 264/51; 264/54; 264/328.7
[58] Field of Search .................. 264/328.7, 45.1, 264/51, 54; 425/575

[56] References Cited

U.S. PATENT DOCUMENTS

| | | | |
|---|---|---|---|
| 3,767,742 | 10/1973 | Robin | 264/328.7 |
| 3,793,415 | 2/1974 | Smith | 264/328.7 |
| 4,031,176 | 6/1977 | Molbert | 264/328.7 |
| 4,092,385 | 5/1978 | Balevski et al. | 264/328.7 |
| 4,154,784 | 5/1979 | Ruhl | 264/328.7 |
| 5,198,163 | 3/1993 | Yamamoto et al. | 264/328.7 |
| 5,248,459 | 9/1993 | Fukasawa et al. | 264/328.7 |
| 5,252,269 | 10/1993 | Hara et al. | 264/328.7 |
| 5,281,376 | 1/1994 | Hara et al. | 264/328.7 |
| 5,292,465 | 3/1994 | Kobayashi et al. | 264/328.7 |
| 5,372,491 | 12/1994 | Fritsch et al. | 264/328.7 |

FOREIGN PATENT DOCUMENTS 61-68209  4/1986  Japan ....................... 264/328.7

*Primary Examiner*—Allan R. Kuhns
*Attorney, Agent, or Firm*—Armstrong, Westerman, Hattori, McLeland & Naughton

[57] ABSTRACT

A foam injection molding method which makes it possible to control physical properties of high-expansion ratio molded parts with a high degree of freedom of interfacial configuration. With a molding material charged in a closed initial cavity (8) formed by three mold elements (1, 2 and 3), an intermediate cavity having a smaller volumetric capacity than that of the initial cavity (8) and an intermediate cavity having a larger volumetric capacity than that of a final cavity (9) are formed by moving at least one mold element (3) relative to the other two mold elements (1 and 2) without moving these mold elements (1 and 2) while keeping the cavity closed, which is formed by the three mold elements (1, 2 and 3).

3 Claims, 8 Drawing Sheets

CAVITY EXPANDING AND CONTRACTING FOAM INJECTION MOLDING METHOD

BACKGROUND OF THE INVENTION

The present invention relates to a foam injection molding method wherein high-expansion ratio foaming is effected in a mold. More particularly, the present invention relates to a foam injection molding method wherein high-expansion ratio foaming is effected in a mold under control by expanding and contracting the cavity, while keeping it closed, by moving a mold element.

Plastics can be given various properties by foaming them. Particularly, the following various properties can be imparted to plastics by foaming: heat insulating, sound absorbing, vibration damping, buoyant, elastic, lightweight, liquid guiding, dust-resistant (filtering), friction and non-slip properties. Many foam moldings have recently been employed for various purposes by making use of these properties. It is expected that there will be an increase in the demand for composite moldings incorporating a foamed molded part in a part thereof to utilize the above-described properties.

At present, foaming is carried out mainly by injection molding and extrusion. Injection molding, which is superior to extrusion in moldability, is a method wherein a relatively small amount of molding material containing a blowing agent is injected into a cavity in a mold under low pressure, and the cavity is filled with the molding material by foaming caused by the blowing agent. As the blowing agent, a low-boiling point petroleum solvent may be used, but an azodicarbonamide or oxybissulfonyl hydrazide compound is generally employed.

Such a foam injection molding method has difficulty in controlling the amount of molding material injected because the molding material is foamed in the cavity with a fixed volumetric capacity to fill it. Accordingly, moldings produced by foaming are generally low-expansion ratio molded parts; no molded parts of high-expansion ratio can be obtained by the above-described injection molding method.

FIGS. 1(a) and 1(b) show a known high-expansion ratio injection molding method. As shown in FIG. 1(a), the conventional injection molding method employs an injection mold composed of two mold elements, i.e., a stationary mold element 01 and a movable mold element 02. The movable mold element 02 is slidable relative to the stationary mold element 01. As shown in FIG. 1(a), an initial cavity 03 is formed by the two mold elements 01 and 02. The initial cavity 03 is rapidly filled with a molding material containing a blowing agent. Immediately after the filling process, the movable mold element 02 is moved backward relative to the stationary mold element 01 to enlarge the cavity volume, thereby forming a final cavity 04 as shown in FIG. 1(b).

The charged molding material is foamed in the expanded cavity 04, formed as described above. This foam injection molding method enables the expansion ratio to be increased. In other words, the described foam injection molding method enables high-expansion ratio foaming.

If the mold is cooled immediately after the charging of the molding material, the material that is present at the interface between the cavity and the mold inner surface is immediately cooled. When the material at the interface is rapidly cooled, a skin is formed on the foaming material molded, and a relatively lightweight molded part having a skin layer is obtained. Such foam moldings, in which the interior is protected by the skin layer, can be utilized as products or materials which have various properties.

The above-described conventional method, in which the cavity is expanded by moving two mold elements relative to each other to effect high-expansion ratio foaming, suffers, however, from the following two problems: The interfaces a and b of the cavity expansion that is added to the initial cavity, that is, the cavity portion that remains when the initial cavity, which is shown in FIG. 1(a), is subtracted from the final cavity, which is shown in FIG. 1(b), are limited to surfaces S, as shown in FIG. 2, which are formed by scanning movement of the line L of intersection of the cavity forming surface A of the stationary mold element 01 and the cavity forming surface C of the movable mold element 02 having a sliding surface B that slides on the cavity forming surface A. Accordingly, the degree of freedom of the final shape that can be given to the foamed part is limited to a considerably low level.

More generally, when only two mold elements are employed, it is impossible to have a cavity interface that disables the initial cavity 03, which is formed by the two mold elements, from being shifted to the final cavity 04 by moving the two mold elements relative to each other while keeping the cavity closed.

A cavity interface with which the initial cavity 03 cannot be shifted to the final cavity 04 with the cavity kept closed is such that a portion of the cavity forming surface A in the vicinity of the line L of intersection of the two cavity forming surfaces A and C of the two mold elements 01 and 02, which form the closed cavity 03 when they are joined together, is formed from a surface that is not parallel to the direction of movement of the two mold elements 01 and 02.

Since the foam injection molding method that employs only two mold elements suffers from the above-described restriction, it is impossible to form three-dimensional molded parts of high-expansion ratio whose interfaces have neither parallel sliding surfaces nor a surface consisting of a set of parallel lines, for example, a spherical part having a spherical interface, an annular part, such as a doughnut-shaped part, which has a torus interface, a polyhedron, such as a regular tetrahedron, in which any two of the four interfaces are not parallel to each other, a conical part, or a complicated three-dimensional part, such as a tetrapod, which consists of a combination of a plurality of conical surfaces, although it is possible to form a three-dimensional object, e.g., a circular cylinder, which has an interface consisting of a set of parallel lines, by a high-expansion ratio injection molding process. This is the first problem of the conventional method.

Molded parts produced by high-expansion ratio foaming extremely vary in the physical properties according to the bubble size distribution and porosity. In the high-expansion ratio foaming process that is carried out by expanding the cavity, various factors, such as the pressure and temperature in the cavity, the viscosity of the molding material to be foamed, and the shape of the cavity, particularly have effects on the uniformity of dispersion of bubbles generated and the bubble size distribution characteristics. It is not easy to control the uniformity of dispersion of bubbles and the bubble size distribution characteristics by using only the ratio of the volume of the initial cavity to the volume of the final cavity and the cavity expanding time. This is the second problem of the conventional method.

SUMMARY OF THE INVENTION

It is an object of the present invention to provide a cavity expanding and contracting foam injection molding method which enables physical properties of a high-expansion ratio molded part to be properly drawn out by physically controlling foaming when the cavity is expanded.

It is another object of the present invention to provide a cavity expanding and contracting foam injection molding method which enables physical properties of a high-expansion ratio molded part to be properly drawn out by physically controlling foaming when the cavity is expanded, and which makes it possible to form high-expansion ratio molded parts having various shapes with a high degree of freedom of interfacial configuration.

To attain the above-described objects, the present invention provides a foam injection molding method including the steps of: forming a closed initial cavity (8) by using at least two mold elements (1 and 3) which are movable relative to each other; charging a molding material into the initial cavity (8) formed by the cavity forming step; forming an intermediate cavity having a volumetric capacity different from that of the initial cavity (8) by moving one (3) of the two mold elements (1 and 3) relative to the other mold element (1) while keeping the cavity closed, which is formed by the two mold elements (1 and 3); and forming a final cavity (9) having a larger volumetric capacity than that of the initial cavity (8) by moving one (3) of the two mold elements (1 and 3) relative to the other mold element (1) while keeping the cavity closed, which is formed by the two mold elements (1 and 3), and foaming the charged molding material in the final cavity (9), thereby forming a foam injection-molded part.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and of which.

DETAILED DESCRIPTION OF THE PREFERRED EMBODIMENTS

First Embodiment

Figure 1A:
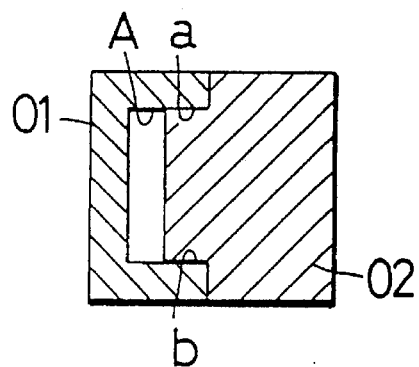
FIGS. 1(a) and 1(b) are sectional views showing a known foam injection molding method.
Figure 1B:
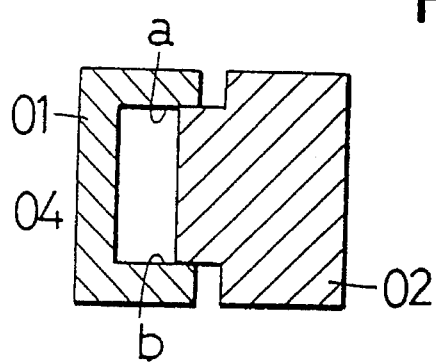
Figure 2:
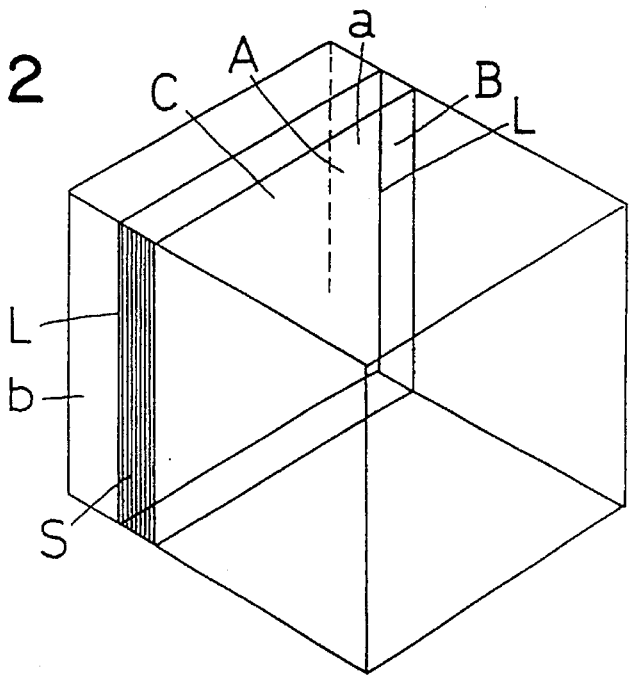
FIG. 2 is an oblique projection for explanation of the restriction on the cavity formation by the known foam injection molding method.
Figure 3:
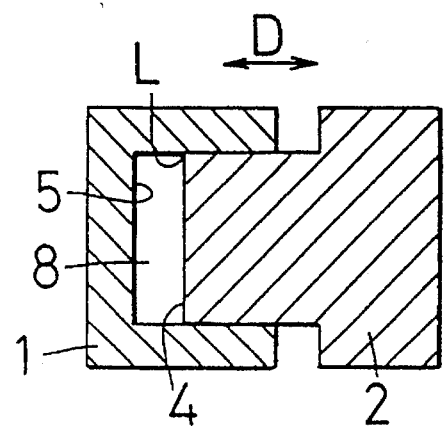
FIG. 3 is a sectional view showing a fundamental arrangement of the cavity expanding and contracting foam injection molding method according to the present invention as a first embodiment.

As shown in FIG. 3, an injection mold is used for foaming process. The injection mold is basically composed of two elements, that is, a mold element 1 and a mold element 2. The mold elements 1 and 2 are movable relative to each other in the directions shown by the arrow D. For the convenience of describing the embodiment, the mold element 1 will be referred to as a mold element on the stationary side, and the mold element 2 as a movable mold element.

The mold element 2 has a flat surface 4 formed on one side thereof. The mold element 1 has a partial rectangular parallelepiped surface 5 which defines a rectangular parallelepiped surface in cooperation with the flat surface 4. The mold elements 1 and 2 are slidable relative to each other. In such a slidable engagement of the mold elements 1 and 2, the flat surface 4 and the partial rectangular parallelepiped surface 5 define a rectangular parallelepiped surface inside the mold elements 1 and 2 joined together. Thus, a cavity is formed as a molding cavity 8 by the two mold elements 1 and 2, which is surrounded by a closed interface defined by the partial rectangular parallelepiped surface 5 of the mold element 1 and the flat surface 4 of the mold element 2.

In the first embodiment, the two cavity forming surfaces 5 and 4 of the two mold elements 1 and 2 form the closed cavity 8 when the two mold elements 1 and 2 are joined together, and a portion of the cavity forming surface 5 which is in the vicinity of the line L of intersection of the two cavity forming surfaces 4 and 5 is formed from a surface parallel to the direction of movement of the two mold elements 1 and 2.

Figure 4:
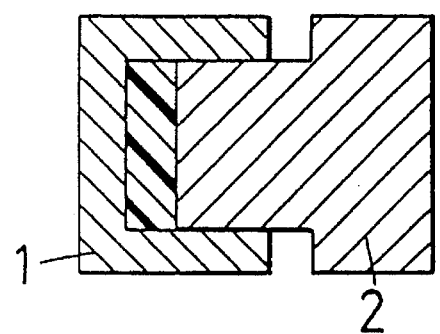
FIG. 4 is a sectional view showing a first step of the first embodiment.

Next, the cavity expanding and contracting foam injection molding method will be explained. FIG. 3 shows a state where the initial cavity 8 has been formed. As shown in FIG. 4, a molding material is charged into the initial cavity 8.

As the molding material, various kinds of engineering plastics, e.g., thermoplastic resin materials, may be employed. Thermoplastic elastomers may also be used. The molding material is mixed with a known blowing agent which appropriately decomposes in a predetermined time under predetermined pressure and temperature conditions, for example, an azodicarbonamide or oxybissulfonyl hydrazide compound.

Figure 5:
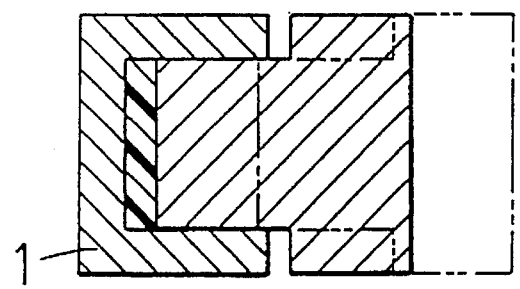
FIG. 5 is a sectional view showing a second step of the first embodiment.
Figure 6:
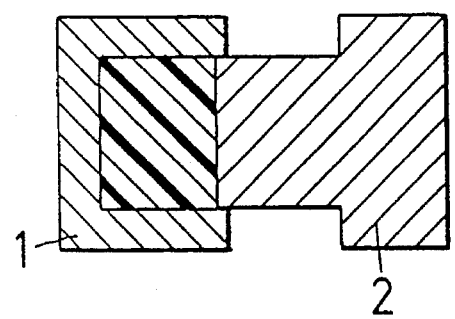
FIG. 6 is a sectional view showing a third step of the first embodiment.

Subsequently to the above-described charging step, the mold element 2 is moved forward, as shown in FIG. 5. Consequently, the cavity that is surrounded by the closed interface defined by the partial rectangular parallelepiped surface 5 of the mold element 1 and the flat surface 4 of the mold element 2 continuously contracts in the state of being closed. FIG. 5 shows a minimum intermediate cavity forming state where the cavity has contracted to a minimum volume. Next, the mold element 2 is moved backward. FIG. 6 shows the most backward position that is reached when the mold element 2 moves backward beyond the initial position where the initial cavity 8 is formed as shown in FIG. 4. FIG. 6 shows a maximum intermediate cavity forming state where the cavity has expanded to a maximum volume.

Figure 7:
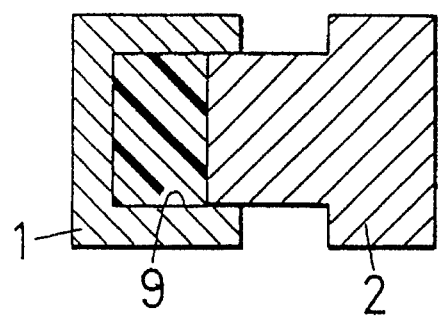
FIG. 7 is a sectional view showing a fourth step of the first embodiment.

Next, the mold element 2 is moved forward. FIG. 7 shows a final step where a final cavity 9 has been formed. The volume of the final cavity 9 is larger than the volume of the minimum intermediate cavity, shown in FIG. 5, but smaller than the maximum intermediate cavity, shown in FIG. 6.

In the contracting step shown in FIG. 5, the pressure in the cavity rises during the contraction, causing the foaming species of the resin material to be dispersed and diffused. The resin material having foaming species uniformly dispersed therein is allowed to foam by the increase in volume, producing voids therein. When the resin material having voids produced therein contracts again, the sizes of the voids become uniform. In such a foaming process, the void size and the void density can be controlled by changing the rate of contraction of the minimum intermediate cavity and the rate of expansion of the maximum intermediate cavity.

Since the cavity expands and contracts in an oscillatory manner during the contacting process, the diffusion of the foaming species and the voids is further promoted, and the void sizes and densities are made uniform even more effectively.

FIG. 7 shows a foaming process in which the molding material charged in the previous charging step is allowed to foam in the final cavity 9, which has been expanded by the cavity expanding step, to form a foamed molded part having the same shape as that of the final cavity 9. The rectangular parallelepiped molded part formed in the injection mold is removed by moving the mold elements 1 and 2 away from each other in the same way as in the conventional practice.

Second Embodiment

Figure 8:
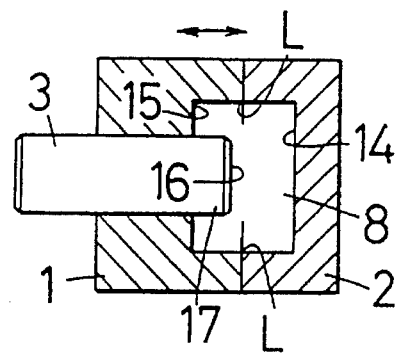
FIG. 8 is a sectional view showing a fundamental arrangement of the cavity expanding and contracting foam injection molding method according to the present invention as a second embodiment.
Figure 9:
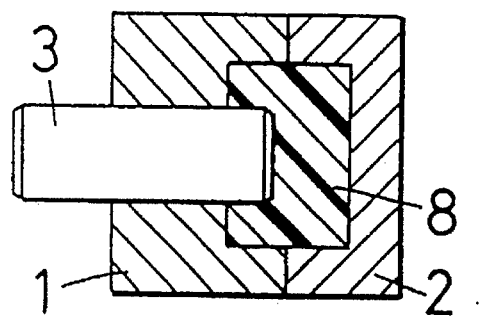
FIG. 9 is a sectional view showing a first step of the second embodiment.

As shown in FIG. 8, the injection mold used in the second embodiment is basically composed of three elements, that is, a mold element 1, a mold element 2, and a mold element 3. The mold elements 1 and 2 are movable relative to each other in the direction D. For the convenience of describing the embodiment, the mold element 1 will be referred to as a mold element on the stationary side, and the mold element 2 as a movable mold element.

The mold element 2 has a half-rectangular parallelepiped surface 14 formed on one side thereof. The mold element 1 is formed with a half-rectangular parallelepiped surface 15 which defines a substantially rectangular parallelepiped interface in cooperation with the half-rectangular parallelepiped surface 14. The mold elements 1 and 2 are butted against each other. In this butt state, the two half-rectangular parallelepiped surfaces 14 and 15 define a substantially rectangular parallelepiped surface inside the mold elements 1 and 2 butted against each other. The substantially rectangular parallelepiped surface is a rectangular parallelepiped surface lacking a part thereof. In other words, the rectangular parallelepiped surface has an opening.

The opening is provided in the mold element 1. The mold element 3 is slidably provided in the mold element 1 so as to project from the opening. Thus, a cavity is formed as a molding cavity 8 by the three mold elements 1, 2 and 3, which is surrounded by a closed interface defined by the half-rectangular parallelepiped surface 15 of the mold element 1, the half-rectangular parallelepiped surface 14 of the mold element 2, the partial rectangular parallelepiped surface 16 of the mold element 3, which is the projecting end surface thereof, and the remaining surface 17 of the projecting portion of the mold element 3.

In the second embodiment, the two cavity forming surfaces 15 and 14 of the two mold elements 1 and 2 form the closed cavity 8 when the two mold elements 1 and 2 are joined together, and portions of the cavity forming surfaces 14 and 15 which are in the vicinity of the intersection line L are formed from surfaces parallel to the direction of movement of the two mold elements 1 and 2.

Figure 10:
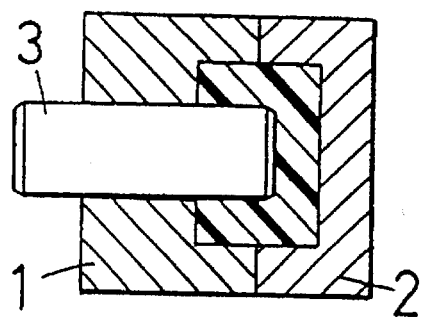
FIG. 10 is a sectional view showing a second step of the second embodiment.
Figure 11:
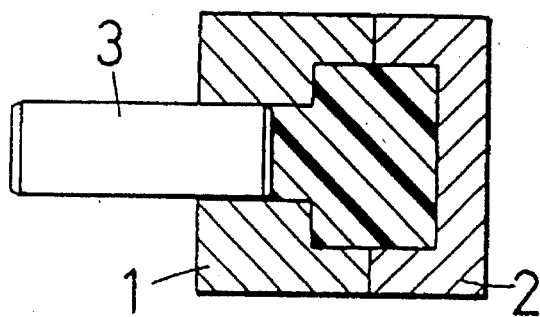
FIG. 11 is a sectional view showing a third step of the second embodiment.
Figure 12:
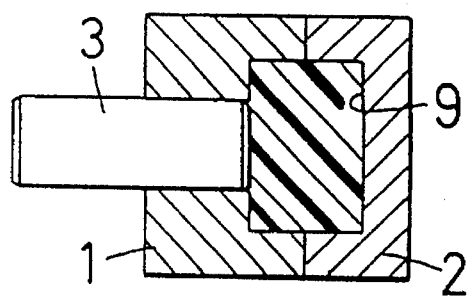
FIG. 12 is a sectional view showing a fourth step of the second embodiment.

In the process of shifting the initial cavity 8 (at the injection step shown in FIG. 10) to the final cavity 9 (at the final foaming step shown in FIG. 12), the cavity volume is temporarily made smaller than the volume of the initial cavity 8 (see FIG. 10) and then larger than the volume of the final cavity 9 (see FIG. 11) in the same way as in the first embodiment. The second embodiment differs from the first embodiment in that such a cavity expanding and contracting operation is effected by the forward and backward movement of the mold element 3, which is movable relative to the mold elements 1 and 2.

In the above-described foaming process, the cavity that is formed by the two mold elements 1 and 2 is expanded, while being kept closed, by the movement of the third mold element 3, which is movable independently of the mold elements 1 and 2. Accordingly, the cavity expands and contracts without the need of movement of the two mold elements 1 and 2. The rectangular parallelepiped molded part formed in the injection mold is removed by moving the mold elements 1 and 2 away from each other in the same way as in the conventional practice.

Third Embodiment

Figure 13:
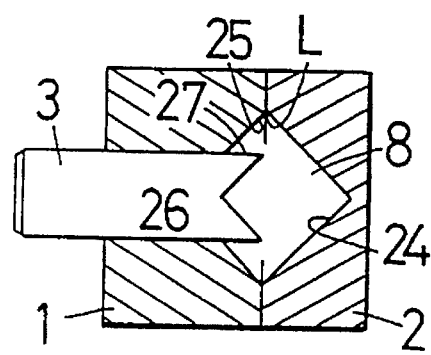
FIG. 13 is a sectional view showing a fundamental arrangement of the cavity expanding and contracting foam injection molding method according to the present invention as a third embodiment.

As shown in FIG. 13, the injection mold used in the third embodiment is basically composed of three mold elements, that is, a mold element 1, a mold element 2, and a mold element 3, in the same way as in the second embodiment. The mold elements 1 and 2 are movable relative to each other in the direction D. For the convenience of describing the embodiment, the mold element 1 will be referred to as a mold element on the stationary side, and the mold element 2 as a movable mold element.

The mold element 2 has a half-cubic surface 24 formed on one side thereof. The mold element 1 is formed with a partial cubic surface 25 which defines a substantially cubic interface in cooperation with the half-cubic surface 24. The mold elements 1 and 2 are butted against each other. In this butt state, the half-cubic surface 24 and the partial cubic surface 25 define a substantially cubic surface inside the mold elements 1 and 2 butted against each other. The substantially cubic surface is a cubic surface lacking a part thereof. In other words, the cubic surface has an opening.

The opening is provided in the mold element 1. The mold element 3 is slidably provided in the mold element 1 so as to project from the opening. Thus, a cavity is formed as a molding cavity 8 by the three mold elements 1, 2 and 3, which is surrounded by a closed interface defined by the partial cubic surface 25 of the mold element 1, the half-cubic surface 24 of the mold element 2, the partial cubic surface 26 of the mold element 3, which is the projecting end surface thereof, and the remaining surface 27 of the projecting portion of the mold element 3.

In the third embodiment, the two cavity forming surfaces 25 and 24 of the two mold elements 1 and 2 form the closed cavity 8 when the two mold elements 1 and 2 are joined together, and portions of the cavity forming surfaces 24 and 25 which are in the vicinity of the intersection line L are formed from surfaces which are not parallel to the direction of movement of the two mold elements 1 and 2. Such non-parallel surfaces 24 and 25 are not parallel to the direction D of movement.

Figure 14:
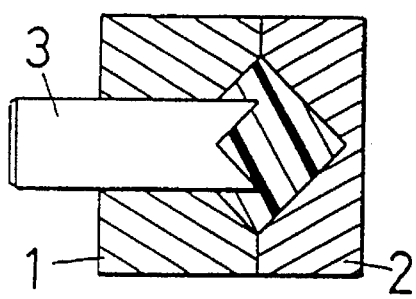
FIG. 14 is a sectional view showing a first step of the third embodiment.
Figure 15:
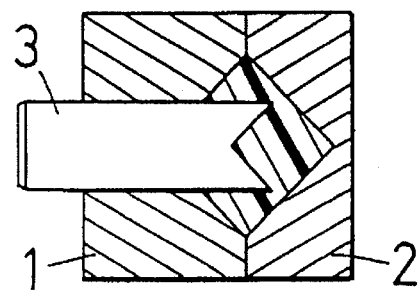
FIG. 15 is a sectional view showing a second step of the third embodiment.
Figure 16:
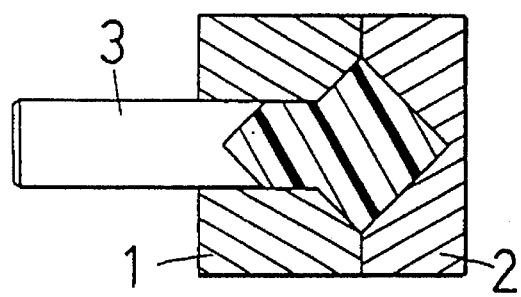
FIG. 16 is a sectional view showing a third step of the third embodiment.
Figure 17:
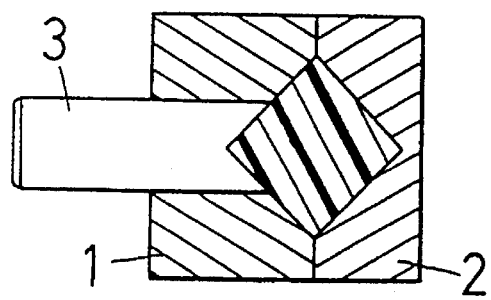
FIG. 17 is a sectional view showing a fourth step of the third embodiment.

In the process of shifting the initial cavity 8 (at the injection step shown in FIG. 14) to the final cavity 9 (at the final foaming step shown in FIG. 17), the cavity volume is temporarily made smaller than the volume of the initial cavity 8 (see FIG. 15) and then larger than the volume of the final cavity 9 (see FIG. 16) in the same way as in the first and second embodiments. The third embodiment is different from the first embodiment but the same as the second embodiment in that such a cavity expanding and contracting operation is effected by the forward and backward movement of the mold element 3, which is movable relative to the mold elements 1 and 2.

In the above-described foaming process, the cavity that is formed by the two mold elements 1 and 2 is expanded, while being kept closed, by the movement of the third mold element 3, which is movable independently of the mold elements 1 and 2. Accordingly, the cavity expands and contracts without the need of movement of the two mold elements 1 and 2. The cubic molded part formed in the injection mold is removed by moving the mold elements 1 and 2 away from each other in the same way as in the conventional practice.

Fourth Embodiment

Figure 18:
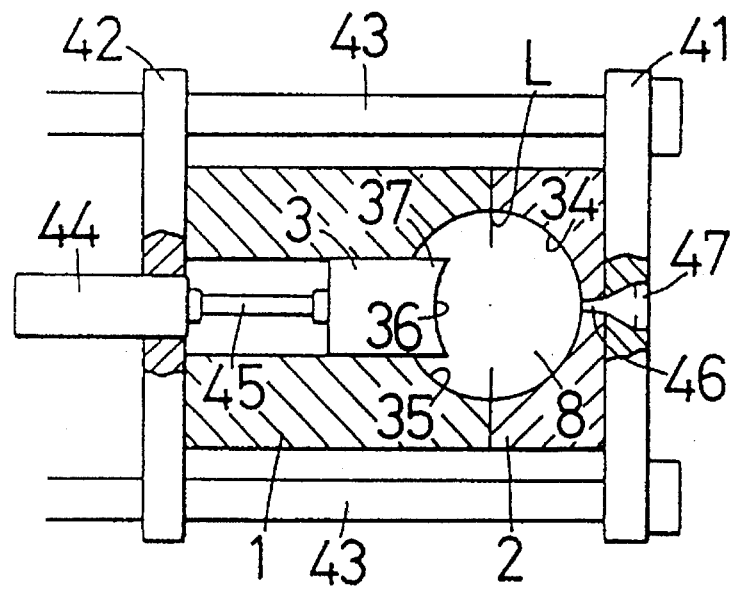
FIG. 18 is a sectional view showing a fundamental arrangement of the cavity expanding and contracting foam injection molding method according to the present invention as a fourth embodiment.

FIG. 18 shows a fourth embodiment of the present invention. In this embodiment, a conventional injection molding machine is used for foaming process. The injection molding machine has a stationary platen 41, a movable platen 42, and a plurality of guide rods 43 for guiding the movement of the movable platen 42. The movable platen 42 is disposed to face the stationary platen 41 and driven by a hydraulic cylinder (not shown) to move forward and backward relative to the stationary platen 41.

The injection mold is basically composed of three elements, that is, a mold element 1, a mold element 2, and a mold element 3. The mold element 1 is attached to the movable platen 42. The mold element 2 is attached to the stationary platen 41. The mold elements 1 and 2 are movable relative to each other. For the convenience of describing the embodiment, the mold element 1 will be referred to as a mold element on the movable side, and the mold element 2 as a stationary mold element.

The mold element 1 is provided with a pneumatic cylinder 44. The top of a piston rod 45 of the pneumatic cylinder 44 is attached to the mold element 3. The mold element 3 is slidably guided in the mold element 1. The mold element 2 is provided with a gate 46. The cavity 8 is filled with a molding material containing a blowing agent from an injection nozzle of an injection pipe 47 through the gate 46.

The mold element 2 has a hemispherical surface 34 formed on one side thereof. The mold element 1 is formed with a hemispherical surface 35 which forms a substantially spherical surface in cooperation with the hemispherical surface 34. The mold elements 1 and 2 are butted against each other. In this butt state, the hemispherical surface 34 and the hemispherical surface 35 define a substantially spherical surface inside the mold elements 1 and 2 butted against each other. The substantially spherical interface is a spherical surface lacking a part thereof. In other words, the spherical surface has an opening.

The opening is provided in the mold element 1. The mold element 3 is slidably provided in the mold element 1 so as to project from the opening. Thus, a cavity is formed as a molding cavity 8 by the three mold elements 1, 2 and 3, which is surrounded by a closed interface defined by the hemispherical surface 35 of the mold element 1, the hemispherical surface 34 of the mold element 2, the partial spherical surface 36 of the mold element 3, which is the projecting end surface thereof, and the remaining surface 37 of the projecting portion of the mold element 3.

In the fourth embodiment, the two cavity forming surfaces 35 and 34 of the two mold elements 1 and 2 form the closed cavity 8 when the two mold elements 1 and 2 are joined together, and portions of the cavity forming surfaces 34 and 35 which are in the vicinity of the intersection line L are formed from surfaces which are not parallel to the direction of movement of the two mold elements 1 and 2. Such non-parallel surfaces, that is, the hemispherical surfaces 34 and 35, are not parallel to each other and not parallel to the direction D of movement of the two mold elements 1 and 2.

Figure 22:
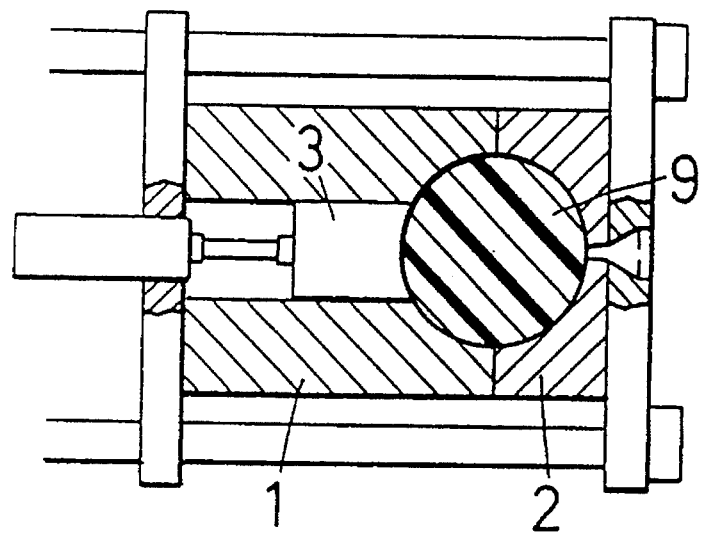
FIG. 22 is a sectional view showing a fourth step of the fourth embodiment.
Figure 19:
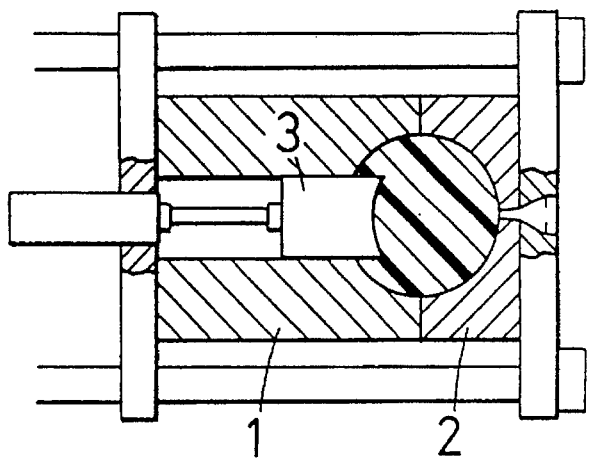
FIG. 19 is a sectional view showing a first step of the fourth embodiment.
Figure 20:
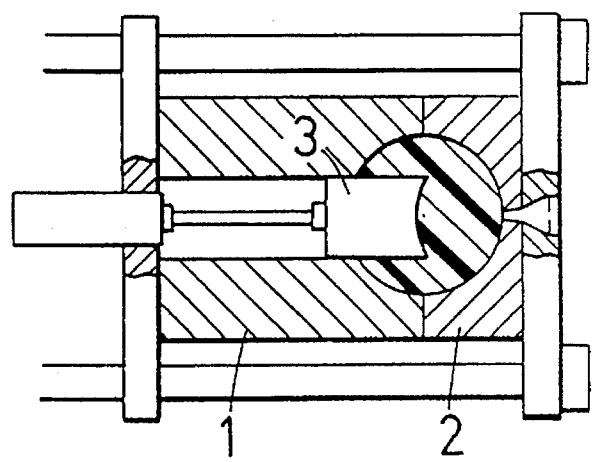
FIG. 20 is a sectional view showing a second step of the fourth embodiment.
Figure 21:
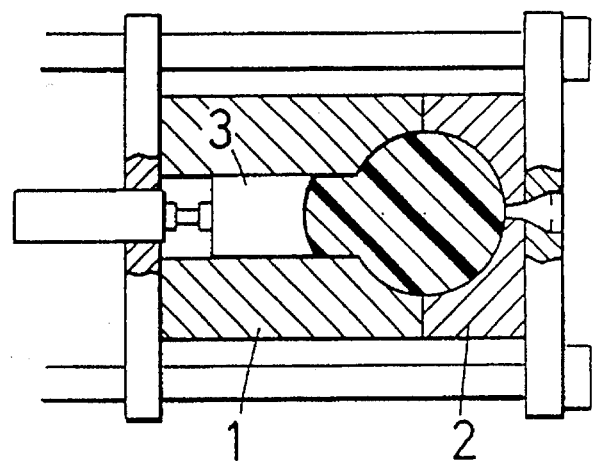
FIG. 21 is a sectional view showing a third step of the fourth embodiment.

In the process of shifting the initial cavity 8 (at the injection step shown in FIG. 19) to the final cavity 9 (at the final foaming step shown in FIG. 22), the cavity volume is temporarily made smaller than the volume of the initial cavity 8 (see FIG. 20) and then larger than the volume of the final cavity 9 (see FIG. 21) in the same way as in the first, second and third embodiments. The fourth embodiment is different from the first embodiment but the same as the second and third embodiments in that such a cavity expanding and contracting operation is effected by the forward and backward movement of the mold element 3, which is movable relative to the mold elements 1 and 2.

In the above-described foaming process, the cavity that is formed by the two mold elements 1 and 2 is expanded, while being kept closed, by the movement of the third mold element 3, which is movable independently of the mold elements 1 and 2. Accordingly, the cavity expands and contracts without the need of movement of the two mold elements 1 and 2. The spherical molded part formed in the injection mold is removed by moving the mold elements 1 and 2 away from each other in the same way as in the conventional practice.

In the foregoing embodiments, the present invention has been described by way of an example in which a cavity forming surface in the vicinity of the intersection line L is a flat surface, a spherical surface, a torus surface, or a conical surface. However, molded parts generally have a more complicated three-dimensional interface. The present invention may be applied to the process of foaming three-dimensional objects having various interfacial configurations, e.g., a wheel, a damper of an air conditioner, a casing of a portable telephone, an armrest of a chair, etc.

In the foregoing embodiments, no explanation has been given of an intermediate process at the step of contracting the initial cavity 8 to the minimum intermediate cavity and at the step of contracting the maximum intermediate cavity to the final cavity 9. In such contracting steps, expansion and contraction may be repeated a plurality of times in an oscillatory manner. That is, it is possible to add an expansion and contraction step which is slowly carried out several times at a frequency of 2 to 5 times per second. Alternatively, the cavity may be contracted as a whole while being oscillated at a higher frequency.

For example, the contraction and expansion of the cavity volume may be carried out in the following sequence: the initial cavity→an intermediate cavity having a smaller volume than that of the initial cavity→an intermediate cavity having a larger volume than that of the final cavity→the final cavity. The sequence may also be such that: the initial cavity→an intermediate cavity having a larger volume than that of the initial cavity→an intermediate cavity having a smaller volume than that of the final cavity→the final cavity. Such intermediate steps may be repeated several times. By changing the intermediate cavity shifting process, it is possible to change the physical properties of the foamed molded part under control. During the above-described contraction and expansion step, the mold element that is moved may be finely vibrated.

Although the present invention has been described through specific terms, it should be noted here that the described embodiments are not necessarily exclusive and that various changes and modifications may be imparted thereto without departing from the scope of the invention which is limited solely by the appended claims.

What is claimed is:

1. A foam injection molding method comprising the steps of:

(a) forming a closed initial cavity by using at least three mold elements of which one of at least two mold elements is movable relative to the other two mold elements, (b) charging a molding material into the initial cavity formed by said cavity forming step;

(c) forming an intermediate cavity having a volumetric capacity different from that of said initial cavity by moving one of said three mold elements relative to the other two mold elements without moving said other two mold elements while keeping the cavity closed, which is formed by said three mold elements; and (d) forming a final cavity having a larger volumetric capacity than that of said initial cavity by moving one of said three mold elements relative to the other two mold elements without moving said two mold elements while keeping the cavity closed, which is formed by said three mold elements; wherein said capacity of said intermediate cavity is larger than the capacity of said final cavity and foaming said charged molding material occurs in said final cavity, thereby forming a foam injection-molded part.

2. A foam injection molding method according to claim 1, wherein said two mold elements which are not moved during on intermediate cavity expanding and contracting step respectively have cavity forming surfaces, portions of said two cavity forming surfaces which lie in the vicinity of a line of intersection of said two cavity forming surfaces being not parallel to a direction of movement of said two mold elements.

3. A foam injection molding method according to claim 1, wherein said two mold elements which are not moved during said intermediate cavity expanding and contracting step respectively have cavity forming surfaces, portions of said two cavity forming surfaces which lie in the vicinity of a line of intersection of said two cavity forming surfaces being curved surfaces.

* * * * *